United States Patent
Lee

(10) Patent No.: US 12,124,150 B2
(45) Date of Patent: Oct. 22, 2024

(54) RADIO FREQUENCY (RF) PHASE VELOCITY TUNER FOR SETTING AN ELECTROOPTIC (EO) MODULATOR BANDWIDTH AT DIFFERENT OPTICAL WAVELENGTHS

(71) Applicant: Keysight Technologies, Inc., Santa Rosa, CA (US)

(72) Inventor: Gregory S. Lee, Mountain View, CA (US)

(73) Assignee: KEYSIGHT TECHNOLOGIES, INC., Santa Rosa, CA (US)

(*) Notice: Subject to any disclaimer, the term of this patent is extended or adjusted under 35 U.S.C. 154(b) by 151 days.

(21) Appl. No.: 17/688,119

(22) Filed: Mar. 7, 2022

(65) Prior Publication Data

US 2022/0390808 A1 Dec. 8, 2022

Related U.S. Application Data

(60) Provisional application No. 63/192,791, filed on May 25, 2021.

(51) Int. Cl.
*G02F 1/225* (2006.01)
*G02F 1/21* (2006.01)

(52) U.S. Cl.
CPC ............ *G02F 1/2255* (2013.01); *G02F 1/212* (2021.01); *G02F 1/2257* (2013.01)

(58) Field of Classification Search
CPC ........ G02F 1/025; G02F 1/035; G02F 1/0356; G02F 1/2255; G02F 1/212; G02F 1/2257; G02F 2202/20

(Continued)

(56) References Cited

U.S. PATENT DOCUMENTS

| 3,984,675 | A | * | 10/1976 | Corcoran | G02F 1/3534 |
| | | | | | 359/287 |
| 4,928,076 | A | | 5/1990 | Mourou et al. | |
| 5,091,983 | A | * | 2/1992 | Lukosz | G02F 1/295 |
| | | | | | 250/231.19 |

(Continued)

FOREIGN PATENT DOCUMENTS

| CN | 107171047 A1 * | 9/2019 | ............... H01P 7/06 |
| JP | S6448021 A | 2/1989 | |
| JP | 6352789 B2 | 7/2018 | |

OTHER PUBLICATIONS

"Design, analysis and fabrication of the CPW resonator loaded by DGS and MEMS capacitors" by Han et al, J. Micromech. Microeng., vol. 31, paper 065004, Apr. 2021. (Year: 2021).*

(Continued)

*Primary Examiner* — Robert Tavlykaev

(57) ABSTRACT

Electro-optic (EO) modulators are disclosed. The EO modulators include a substrate and an EO material layer disposed over the substrate. The EO material layer and the substrate provide an optical waveguide having an optical group velocity (OGV). The EO modulators also include electrodes disposed over the EO material layer to provide a coplanar waveguide (CPW). The CPW has a radio-frequency (RF) phase velocity, and the electrodes have a gap therebetween. The EO modulators also include a superstrate disposed over the EO material layer and configured to be raised and lowered, or disposed and removed to tune the RF phase velocity to be substantially the same as the OGV, wherein a space exists between the superstrate and the EO material.

15 Claims, 4 Drawing Sheets

(58) Field of Classification Search
USPC .......................................................... 385/1–3
See application file for complete search history.

(56) References Cited

U.S. PATENT DOCUMENTS

| | | | | |
|---|---|---|---|---|
| 5,129,017 | A * | 7/1992 | Kawano | G02F 1/0356 |
| | | | | 385/2 |
| 5,506,919 | A * | 4/1996 | Roberts | G02B 26/02 |
| | | | | 385/23 |
| 9,550,665 | B2 * | 1/2017 | Barker | B81B 3/0013 |
| 9,847,801 | B1 * | 12/2017 | Iannacci | H04B 1/0475 |
| 10,739,664 | B2 * | 8/2020 | Yan | G02F 1/2257 |
| 2007/0279729 | A1 * | 12/2007 | Kothari | G02B 26/001 |
| | | | | 359/291 |
| 2009/0207549 | A1 * | 8/2009 | Shimanouchi | H01G 5/16 |
| | | | | 361/281 |
| 2014/0064653 | A1 * | 3/2014 | Gill | G02F 1/0121 |
| | | | | 385/2 |
| 2018/0252982 | A1 * | 9/2018 | Chen | G02F 1/2257 |
| 2020/0102213 | A1 * | 4/2020 | Haridas | H01P 1/127 |
| 2021/0131873 | A1 | 5/2021 | Zeiler et al. | |
| 2022/0026634 | A1 * | 1/2022 | Bahadori | G02B 6/29338 |

OTHER PUBLICATIONS

"Design and Simulation of Switchable Band-Pass Resonator using RF MEMS for Wireless Applications" by Shenbagadevi et al, Proceedings of International Conference on Optical Imaging Sensor and Security (Year: 2013).*

"In traveling wave modulators which velocity to match?" by Spickermann et al, 9th Annual Meeting IEEE Lasers and Electro-Optics Society, vol. 2, pp. 97-98 (Year: 1998).*

Andrew J. Mercante et al., "Thin film lithium niobate electro-optic modulator with terahertz operting bandwith," Optics Express, 2018, vol. 26, Issue 11, pp. 1-15.

Cheng Wang et al., "Integrated lithium niobate electro-optic modulators operating at CMOS-compatible voltages," Nature, 562, 2018, pp. 1-14.

Peter O. Weigel et al., "Bonded thin film lithium niobate modulator on a silicon photonics platform exceeding 100 GHz 3-dB electrical modulation bandwidth," Optics Express, vol. 26, No. 18, Sep. 3, 2018, pp. 23728-23739.

English translation of JPS6448021A, 5 pgs.
English translation of JP6352789B2, 10 pgs.

* cited by examiner

RADIO FREQUENCY (RF) PHASE VELOCITY TUNER FOR SETTING AN ELECTROOPTIC (EO) MODULATOR BANDWIDTH AT DIFFERENT OPTICAL WAVELENGTHS

CROSS-REFERENCE TO RELATED APPLICATION

The present application claims priority under 35 U.S.C. § 119(e) to U.S. Provisional Application No. 63/192,791 filed on May 25, 2021. The entire disclosure of U.S. Provisional Application No. 63/192,791 is specifically incorporated herein by reference in its entirety.

BACKGROUND

As direct injection modulation of lasers at ultra-high bandwidths is very difficult, high-speed (~50 GHz and more) modulation of light is generally done using so-called "external" modulators based on the linear (i.e., Pockels) electrooptic (EO) effect. Many inorganic and organic linear EO materials are known, with $LiNbO_3$ ubiquitous in EO modulators. Unlike organic EO materials, $LiNbO_3$ has excellent power handling and longevity.

In order to attain a comparatively high modulation bandwidth (BW) with $LiNbO_3$ devices, it is desirable to match electrical (e.g., RF phase) velocity and optical velocity due to the traveling-wave nature of the EO interaction. A little less well known is the fact that the specific match that is optimal is between the RF phase velocity and the optical group velocity. A device may feature a respectably low specification (lower being better) known as $V_\pi$, the low-frequency voltage required to achieve $\pi$ radians of phase modulation in a phase modulator or equivalently a maximum-to-minimum intensity change in a Mach-Zehnder modulator (MZM), but if these velocities are highly unequal, the high-frequency version of $V_\pi$ will drastically increase, say above 10 GHz.

Bulk $LiNbO_3$ modulators are limited to about 30 GHz of EO bandwidth. This is because the dielectric tensor of $LiNbO_3$ (LN) is quite high at RF frequencies and the presence of a thick LN substrate provides too much cross section for the RF to occupy, so the electrical wave is inevitably slower than the optical wave. Heroic efforts such as ultra-thick (50 um or more) electrical plating ran out of steam decades ago.

More recently, thin-film $LiNbO_3$ (TFLN) technology has evolved and is used in various EO applications. TFLN more generally relates to a family of technologies in which (<10 um, sometimes <1 um) LN layer is adhered to a top surface of a host substrate having a dielectric constant that is low compared to that of LN. Various optical waveguiding techniques can be employed to confine most of the light inside the LN, whereas the RF electric fields, although most intense where the light resides, spread well outside both above and below the LN layer. Such an electric field profile allows the RF wave to occupy large regions of lower dielectric constant, providing a much more forgiving design space to match velocities. In addition, it becomes easier to keep the RF transmission line characteristic impedance close to 50Ω, which is universal for high frequency instruments.

However, in known devices the typical monotonic decrease in optical group velocity with decreasing wavelength continues to pose problems. There are several fundamental reasons for this behavior. First, the bandgap of LN is ~3.7 eV; it is essentially universal for all optical materials that the index of refraction increases as the photon energy increases toward the bandgap, which is what happens as one decreases wavelength. Thus, the optical phase velocity will decrease as wavelength decreases—this happens even in bulk LN. Second, this bulk index behavior accelerates with photon energy, so the bulk LN group index (inversely proportional to the group velocity) increases even faster since it includes a term proportional to the wavelength derivative of the refractive index. Third, in TFLN optical waveguides the fraction of light in the LN increases as wavelength decreases, so these effects are even further accentuated.

For example, two of the most important wavelengths in optical communications are 1310 nm and 1550 nm, the former being the minimum dispersion wavelength for silica optical fiber and the latter being the minimum loss wavelength. Whereas a number of institutions have published >110 GHz BW using some variant of TFLN at 1550 nm, none of these devices can attain such bandwidth at both wavelengths.

What is needed, therefore, is an EO modulator that overcomes at least the above-referenced drawbacks described above.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
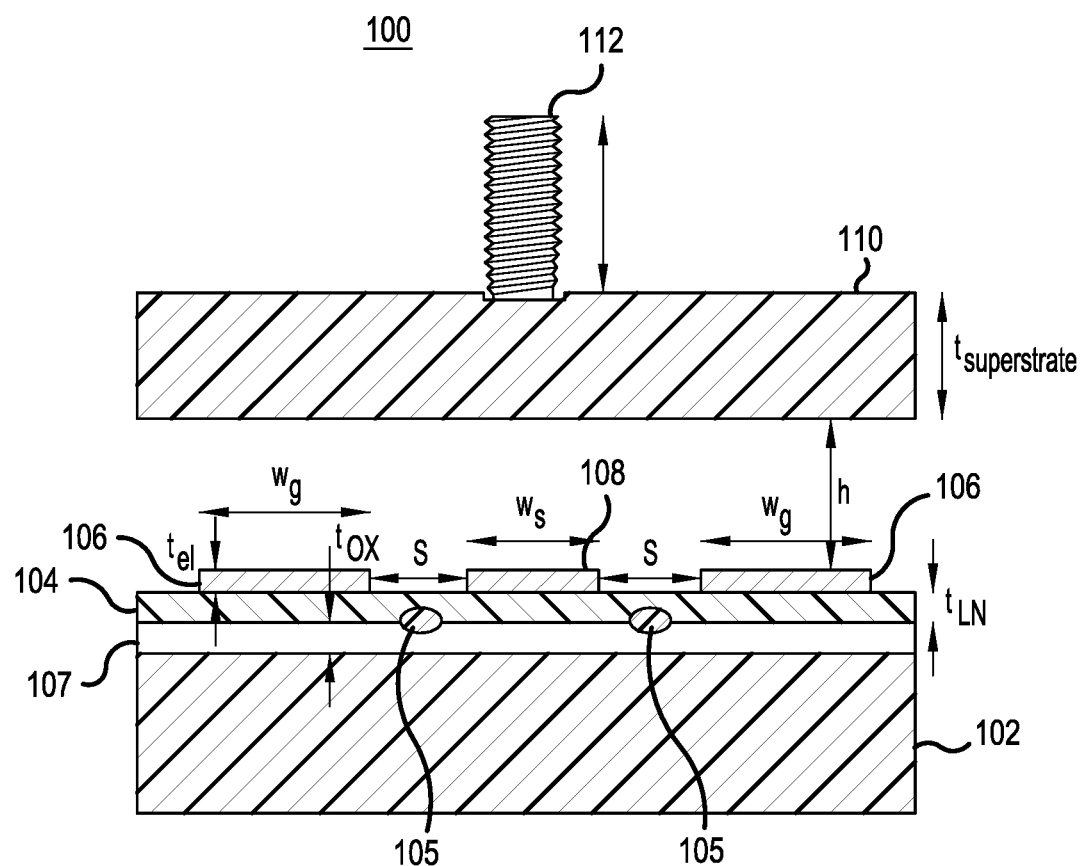
FIG. 1 is a cross-sectional view of an EO modulator, according to a representative embodiment.

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

Unless otherwise noted, when a first element is said to be connected to a second element, this encompasses cases where one or more intermediate elements may be employed to connect the two elements to each other. However, when a first element is said to be directly connected to a second element, this encompasses only cases where the two elements are connected to each other without any intermediate or intervening devices. Similarly, when a signal is said to be coupled to an element, this encompasses cases where one or more intermediate elements may be employed to couple the signal to the element. However, when a signal is said to be directly coupled to an element, this encompasses only cases where the signal is directly coupled to the element without any intermediate or intervening devices.

As used in the specification and appended claims, the terms "a", "an" and "the" include both singular and plural referents, unless the context clearly dictates otherwise. Thus, for example, "a device" includes one device and plural devices. As used in the specification and appended claims, and in addition to their ordinary meanings, the terms "substantial" or "substantially" mean to within acceptable limits or degree. As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Relative terms, such as "above," "below," "top," "bottom," may be used to describe the various elements" relationships to one another, as illustrated in the accompanying drawings. These relative terms are intended to encompass different orientations of the elements thereof in addition to the orientation depicted in the drawings. For example, if an apparatus (e.g., a signal measurement device) depicted in a drawing were inverted with respect to the view in the drawings, an element described as "above" another element, for example, would now be "below" that element. Similarly, if the apparatus were rotated by 90° with respect to the view in the drawings, an element described "above" or "below" another element would now be "adjacent" to the other element; where "adjacent" means either abutting the other element, or having one or more layers, materials, structures, etc., between the elements.

In EO modulators, the specific match that is optimal is between the RF phase velocity and the optical group velocity. A device may feature a respectably low specification (lower being better) known as $V_\pi$, the low-frequency voltage required to achieve $\pi$ radians of phase modulation in a phase modulator or equivalently a maximum-to-minimum intensity change in a Mach-Zehnder modulator (MZM), but if these velocities are highly unequal, the high-frequency version of V, will drastically increase, say above 10 GHz. As described more fully below, beneficially, by the present teachings the RF phase velocity and the optical group velocity are substantially the same at the selected wavelengths of operation.

In accordance with one aspect of the present disclosure, an EO modulator comprises: a substrate; an EO material layer disposed over the substrate, wherein the EO material layer and the substrate provide an optical waveguide having an optical group velocity (OGV); electrodes disposed over the EO material layer to provide a coplanar waveguide (CPW). The CPW has a radio-frequency (RF) phase velocity, and the electrodes having a gap therebetween. The EO modulator also comprises a superstrate disposed over the EO material layer and configured to be raised and lowered to tune the RF phase velocity to be substantially the same as the OGV, wherein a space exists between the superstrate and the EO material.

In accordance with one aspect of the present disclosure, an EO modulator comprises: a substrate; an EO material layer disposed over the substrate, wherein the EO material layer and the substrate provide an optical waveguide having an optical group velocity (OGV); and electrodes disposed over the EO material layer to provide a coplanar waveguide (CPW). The CPW has a radio-frequency (RF) phase velocity, and the electrodes having a gap therebetween. The EO modulator also comprises a superstrate disposed over the EO material layer. The superstrate is configured to be removed from the EO modulator to tune the RF phase velocity to be substantially the same as the OGV, wherein a space exists between the superstrate and the EO material. FIG. 1 is a cross-sectional view of an EO modulator 100, according to a representative embodiment. The EO modulator 100 comprises a substrate 102, and an EO material layer 104 disposed over the substrate 102. Ground electrodes 106 are disposed on both sides of a signal electrode 108, with the ground electrodes 106 having a width $w_g$, and signal electrodes $w_s$. The ground and signal electrodes 106, 108 have a thickness $t_{el}$. Notably, the choice of electrode thickness is a compromise involving many factors. Thin electrodes (e.g., <2 um), are comparatively easy to define (e.g., using a known liftoff process) but have higher conductor loss. Comparatively thick electrodes result in lower RF loss, but generally entail electroplating, which adds manufacturing cost at least because of the need to control the lateral features. Thicker electrodes also result in faster RF propagation (since the air is sampled more by the CPW), but a downside is reduction in characteristic impedance. As a result, a match of the RF phase velocity and the OGV may come at the expense of poor impedance match. As shown, the ground electrodes 106 are spaced from the signal electrode 108 by a distance 'S' and provide a coplanar waveguide (CPW). In a representative embodiment, a thin film adhesion-promoting layer 107 (e.g., an oxide such as $SiO_2$) is disposed between the EO material layer 104, which is illustratively a thin film of lithium niobate ($LiNbO_3$) (TFLN). Optical waveguide cores ('cores') 105 are disposed in the EO material layer 104 as shown, and are made of silicon with the EO material layer 104 and the substrate 102 providing the cladding layer for the optical waveguides comprising the optical waveguide cores 105. Other known materials such as silicon nitride, titanium(Ti)-doped $LiNbO_3$, or proton-exchanged $LiNbO_3$ are also contemplated for the optical waveguide cores 105.

As depicted in FIG. 1, the optical waveguides are disposed in the space S between the ground electrodes 106 and the signal electrode 108, and slightly below the ground electrodes 106 and the signal electrode 108. As will be appreciated by one of ordinary skill in the art, the EO modulator 100 may be used in one of a variety of applications. For example, the optical waveguides may provide arms for a Mach-Zehnder interferometer, such as disclosed in commonly-owned U.S. Patent Application Publication No. 20210131873 entitled "Optical Wavemeter" (attached). The entire disclosure of U.S. Patent Application Publication No. 20210131873 is specifically incorporated herein by reference.

The EO modulator 100 further comprises a superstrate 110 suspended thereabove, and separated from the ground electrodes 106 and signal electrode 108 by a height 'h.' An actuator 112 adapted to raise and lower the superstrate 110 and thereby adjust the height 'h' for reasons explained more fully below. Notably, the actuator 112 may be one of a number of devices within the purview of one of actuator 112 adapted to raise and lower the superstrate 110 and thereby adjust the height 'h' for reasons explained more fully below. Notably, the actuator 112 may be one of a number of devices within the purview of one of ordinary skill in the art. Just by way of example, the actuator 112 may be one of a variety of known microelectromechanical systems (MEMs) devices.

In certain embodiments, as described more fully below, the superstrate 110 is adapted to be disposed in a first position at which the RF phase velocity of the CPW substantially matches the OGV at a first optical wavelength; and after movement of the superstrate 110 by the actuator 112, the superstrate 110 is adapted to be disposed in a second position at which the RF phase velocity of the CPW substantially matches the OGV at a second optical wavelength. Notably, as will become clearer as the present description continues, the adjustment of the height 'h' affords the option of having an EO modulator that can be tuned so the RF phase velocity of the CPW substantially matches the OGV at a number of optical wavelengths. Alternatively, the EO modulator 100 may operate in a binary mode, with the height 'h' having two values to match the RF phase velocity of the CPW substantially matches the OGV at two optical wavelengths (e.g., 1310 nm and 1550 nm). In accordance with a representative embodiment, the substrate 102 comprises silicon (Si) or other suitably material commonly used in TFLN modulators and thus are within the purview of one of ordinary skill in the art. The superstrate 110 comprises one of a silicon layer having a resistivity of 100 Ω-cm, a substantially electrically insulating layer, a GaAs layer, an InP layer, a sapphire layer, an alumina layer, a $TiO_2$ layer, or a $SrTiO_3$ layer. In one representative embodiment in which the superstrate layer 110 comprises layer of high-resistivity silicon, microelectronic fabrication technology provides a comparatively precise and smooth-surface superstrate 110. Specifically, if the superstrate 110 is not comparatively flat, control of the RF phase velocity may become non-monotonic versus height 'h.' More generally, the superstrate 110 may also be made from other electrical insulators such as gallium arsenide (GaAs), indium phosphide (InP), sapphire, alumina, and certain glass materials (e.g., $TiO_2$, and $SrTiO_3$). Notably, these materials have a comparatively low dielectric loss and a substantially higher dielectric constant than air. The higher dielectric constant is beneficial because strong tuning can be realized without requiring the height 'h' to be too small, which provides structural integrity. Notably, when the height 'h' approaches approximately 1 micrometer, crash damage may occur. The latter is what provides strong tuning without requiring h to be too small. I worry about crash damage if h ~1 um.

As alluded to above, the EO modulator 100 is adapted to function at a variety of wavelengths, while beneficially providing an RF phase velocity of the CPW that substantially matches the OGV. At comparatively longer operating optical wavelengths, such as 1550 nm, the superstrate 110 is raised comparatively high above the CPW. In accordance with certain representative embodiments, the height 'h' is selected to be significantly greater than (e.g., at least twice as large as) the spacing 's' between the signal electrode 108 and the ground electrodes 106. The entire CPW structure comprising the EO material layer 104, thin film adhesion-promoting layer 107, and the substrate 102 is electromagnetically (EM) designed using any of a number of available EM simulation tools so that the RF phase velocity at the highest operating frequency of interest, (e.g., 300 GHz), substantially matches the optical group velocity at 1550 nm in this "bridge up" state. Since bottom of the superstrate 110 ("bridge") is well above the top of the signal electrode 108 and the ground electrodes 106 of the CPW, the height 'h' can be considered at infinity. Thus, at this height 'h' the superstrate 110 can be considered absent, and is equivalent to the EO modulator 100 being optimized and free from electromagnetic coupling to the substrate. Stated somewhat differently, by selecting the height 'h' of the superstrate 110 to be high as noted above, the superstrate 110 functions as a dielectric layer of the CPW having a dielectric constant of air (e.g., 1).

By contrast, at comparatively shorter operating optical wavelengths for the EO modulator 100 (e.g., 1310 nm), the superstrate 110 is lowered (and the height 'h' reduced) by the actuator to be in electromagnetic proximity to the ground electrodes 106 and the signal electrode 108, and functions as a dielectric layer for the CPW having an dielectric constant that is greater than 1, depending on the selected material. Notably, the material selected for the superstrate 110 has a dielectric constant that is substantially greater than 1. As such, an upper dielectric layer, which is a hybrid dielectric layer comprises of the superstrate 110 and the air between the superstrate 110 and the substrate 102 is realized. This hybrid dielectric layer has an effective RF index that is raised compared to the above-noted embodiment where the superstrate 110 is raised high (enough that 'h' is essentially ∞). As a result, the RF phase velocity is reduced compared to when the superstrate is raised to essentially ∞. In this case, the hybrid dielectric layer comprising air and the superstrate 110 provides an optical group index of refraction for the waveguides comprising optical waveguide cores 105 that is higher than when the superstrate 110 is raised to essentially ∞. The comparatively higher group index results in a group velocity that is lower at the shorter wavelength (e.g., 1310) of the EO modulator. Accordingly, using the actuator 112 to adjust the space between the ground and signal electrodes 106, 108 (i.e., 'h') and the superstrate 110, the user can provide a structure at which the RF phase velocity of the CPW substantially matches the OGV of the optical signals traversing the optical waveguides comprising optical waveguide cores 105. As such, by the present representative embodiments, the height 'h' can be adjusted to tune the structure so the optimal matching of the RF phase velocity of the CPW matches the OGV of the optical signals is achieved. Alternatively, the height 'h' can be selected to be disposed at one of two heights 'h;' with a first height 'h' set for operation at one optical wavelength (e.g., 1310 nm), and a second height 'h' set for operation at one optical wavelength (e.g., 1550 nm). Furthermore, and as discussed more fully below, the actuator 112 can be foregone and the material of the superstrate 110 can be selected to provide a dielectric constant, thickness, and height 'h' for function at one optical wavelength and be removed for operation at another optical wavelength.

Notably, the optical modes that traverse the optical waveguides comprising the optical waveguide cores 105 and one of a variety of cladding layers depending on the selected height 'h' and material used for the superstrate 110, is unaffected by the position of the superstrate 110 since the optical modes are confined below the upper surface of the EO material layer 104. As such, the group velocity is not impacted by changes in 'h' or the materials selected for the superstrate 110.

Figure 2:
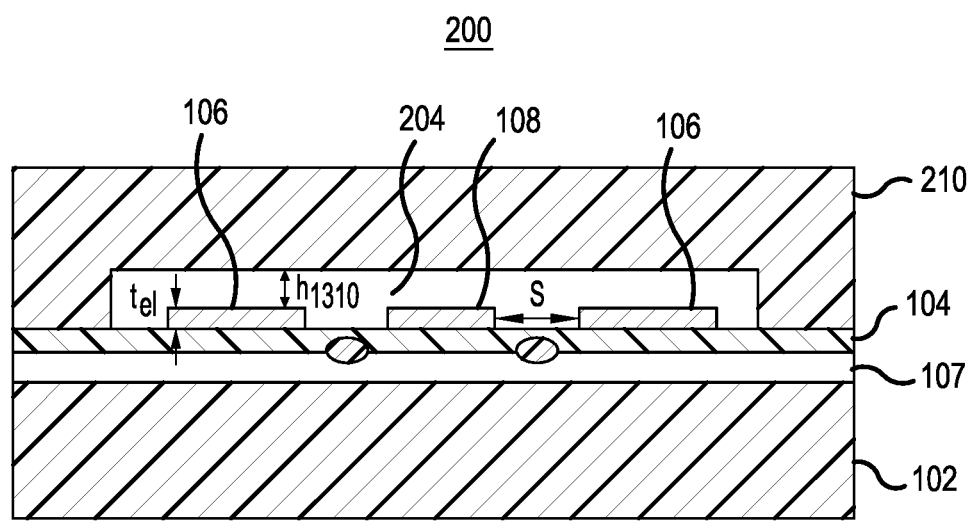
FIG. 2 is a cross-sectional view of an EO modulator according to a representative embodiment.

FIG. 2 is a cross-sectional view of an EO modulator 200, according to a representative embodiment. Various aspects and details of the EO modulator 200 are common to those of EO modulator 100 described above. These common aspects and details may not be repeated to avoid obscuring the presently described representative embodiments.

The EO modulator 200 comprises substrate 102, and EO material layer 104 disposed over the substrate 102. Ground electrodes 106 are disposed on both sides of the signal electrode 108, with the ground electrodes 106 having a width $w_g$, and signal electrodes $w_s$. The ground and signal electrodes 106, 108 have a thickness $t_{el}$ as discussed above. As shown, the ground electrodes 106 are spaced from the signal electrode 108 by a distance 'S' and provide a coplanar waveguide (CPW). In a representative embodiment, thin film adhesion-promoting layer 107 (e.g., an oxide such as $SiO_2$) is disposed between the EO material layer 104, which is illustratively a thin film of lithium niobate ($LiNbO_3$) (TFLN).

Optical waveguide cores ('cores') 105 are disposed in the EO material layer 104 as shown, and are made of silicon with the EO material layer 104 and the substrate 102 providing the cladding layer for the optical waveguides comprising the optical waveguide cores 105. Other known materials such as silicon nitride, titanium(Ti)-doped $LiNbO_3$, or proton-exchanged $LiNbO_3$ are also contemplated for the optical waveguide cores 105. As depicted in FIG. 2, the optical waveguides are disposed in the space S between the ground electrodes 106 and the signal electrode 108, and slightly below the ground electrodes 106 and the signal electrode 108. As will be appreciated by one of ordinary skill in the art, the EO modulator 200 may be used in one of a variety of applications. For example, the optical waveguides may provide arms for a Mach-Zehnder interferometer, such as disclosed in commonly-owned U.S. Patent Application Publication No. 20210131873 entitled "Optical Wavemeter." The entire disclosure of U.S. Patent Application Publication No. 20210131873 is specifically incorporated herein by reference.

The EO modulator 200 further comprises a superstrate 210 disposed thereabove, and separated from the ground electrodes 106 and signal electrode 108 by a height 'h.' As shown, with the superstrate 210 disposed over the substrate 102, a cavity 204 is provided. In the presently described representative embodiment the superstrate 210 is designed to be disposed over the substrate 102 for operation of the EO modulator 200 at one optical wavelength, and to be removed from the substrate 102 for operation of the EO modulator 200 at another optical wavelength.

In certain embodiments, as described more fully below, the superstrate 210 is disposed over the substrate 102 at the height '$h_{1310}$' at which the RF phase velocity of the CPW substantially matches the OGV at a 1310 nm, for example (more generally at a first optical wavelength); and after removal of the superstrate 210, the RF phase velocity of the CPW substantially matches the OGV at 1510 nm, for example, (more generally at a second optical wavelength that is greater than the first optical wavelength). As such, the EO modulator 200 operates in a binary mode, with the height 'h' having two values ('$h_{1310}$' and infinity) to match the RF phase velocity of the CPW substantially matches the OGV at two optical wavelengths (e.g., 1310 nm and 1550 nm).

As alluded to above, the EO modulator 100 is adapted to function at a variety of wavelengths, while beneficially providing an RF phase velocity of the CPW that substantially matches the OGV. At comparatively longer operating optical wavelengths, such as 1550 nm, the superstrate 110 is raised comparatively high above the CPW. In accordance with certain representative embodiments, the superstrate is removed, and as such, much greater than the spacing 's' between the signal electrode 108 and the ground electrodes 106. The entire CPW structure comprising the EO material layer 104, thin film adhesion-promoting layer 107, and the substrate 102 is electromagnetically (EM) designed using any of a number of available EM simulation tools so that the RF phase velocity at the highest operating frequency of interest, (e.g., 300 GHz), substantially matches the optical group velocity at 1550 nm in this "bridge up" state. Since the superstrate 110 is absent, the structure is equivalent to the EO modulator 200 being optimized and free from electromagnetic coupling to the substrate. Stated somewhat differently, by selecting the height 'h' of the superstrate 110 to be high as noted above, the superstrate 110 functions as a dielectric layer of the CPW having a dielectric constant of air (e.g., 1).

By contrast, at comparatively shorter operating optical wavelengths for the EO modulator 100 (e.g., 1310 nm), the superstrate 210 is disposed over the substrate 102 at the height $h_{1310}$ and is in electromagnetic proximity to the ground electrodes 106 and the signal electrode 108. When disposed over the substrate 102 as shown in FIG. 2, the superstrate 210 functions as a dielectric layer for the CPW having a dielectric constant that is greater than 1, depending on the selected material. Notably, the material selected for the superstrate 210 has a dielectric constant that is substantially greater than 1. As such, an upper dielectric layer, which is a hybrid dielectric layer comprises of the superstrate 210 and the air between the superstrate 110 and the substrate 102 is realized. This hybrid dielectric layer has an effective RF index that is raised compared to the above-noted embodiment where the superstrate 110 is removed from the substrate 102. As a result, the RF phase velocity is reduced compared to when the superstrate 210 is removed. In this case, the hybrid dielectric layer comprising air and the superstrate 110 provides an optical group index of refraction for the waveguides comprising optical waveguide cores 105 that is higher than when the superstrate 110 is raised to essentially ∞. The comparatively higher group index results in a group velocity that is lower at the shorter wavelength (e.g., 1310) of the EO modulator. Accordingly, by disposing or removing the superstrate 210 the user can provide a structure at which the RF phase velocity of the CPW substantially matches the OGV of the optical signals traversing the optical waveguides comprising optical waveguide cores 105 at two operational optical wavelengths. As such, by the present representative embodiments, the height 'h' can be set to height $h_{1310}$ or infinity to provide a optimal matching of the RF phase velocity of the CPW matches the OGV at one optical wavelength (e.g., 1310 nm), or for operation at one optical wavelength (e.g., 1550 nm), respectively.

Notably, the optical modes that traverse the optical waveguides comprising the optical waveguide cores 105 and one of a variety of cladding layers depending on the selected height 'h' and material used for the superstrate 110, is unaffected by the position of the superstrate 110 since the optical modes are confined below the upper surface of the EO material layer 104. As such, the group velocity is not impacted by changes in 'h' or the materials selected for the superstrate 110.

Finally, for purposes of illustration and not limitation, an illustrative TFLN optical waveguide (comprising optical waveguide cores 105) may have a group index of 2.29 at 1550 nm but this increases to 2.425 at 1310 nm. In this example, Table 1 provides an exemplary design with dimensions in micrometers:

| $w_s$ | $w_g$ | s | $t_{el}$ | $t_{ox}$ | $t_{LN}$ | $t_{bridge}$ | $h_{1550}$ | $h_{1310}$ |
|---|---|---|---|---|---|---|---|---|
| 20 | 31 | 11 | 1.7 | 2.5 | 0.8 | 50 | >> s | 4.5 |

The dimensional parameters in left to right tabular order are CPW signal electrode 108 width, ground electrodes 106 widths, electrode gap spacing 'S', electrode thickness $t_{el}$, thin film adhesion-promoting layer 107 thickness, EO material layer 104 thickness, superstrate thickness, and height 'h' ($h_{1550}$) bridge clearance at 1550 nm, and (height 'h' $h_{1310}$) at 1310 nm. The characteristic impedance with the superstrate 110 at h=$h_{1310}$ is 48.7Ω, and when h=∞ (i.e., superstrate 110 raised or superstrate 210 removed), the characteristic impedance is approximately 51.4(48.7)Ω ohms. In a 50-ohm system, this means a 37 dB return loss, which is highly beneficial. Again, the dimensions above are merely illustrative and variation to achieve a desired end in keeping with the present teachings is anticipated.

Figure 3:
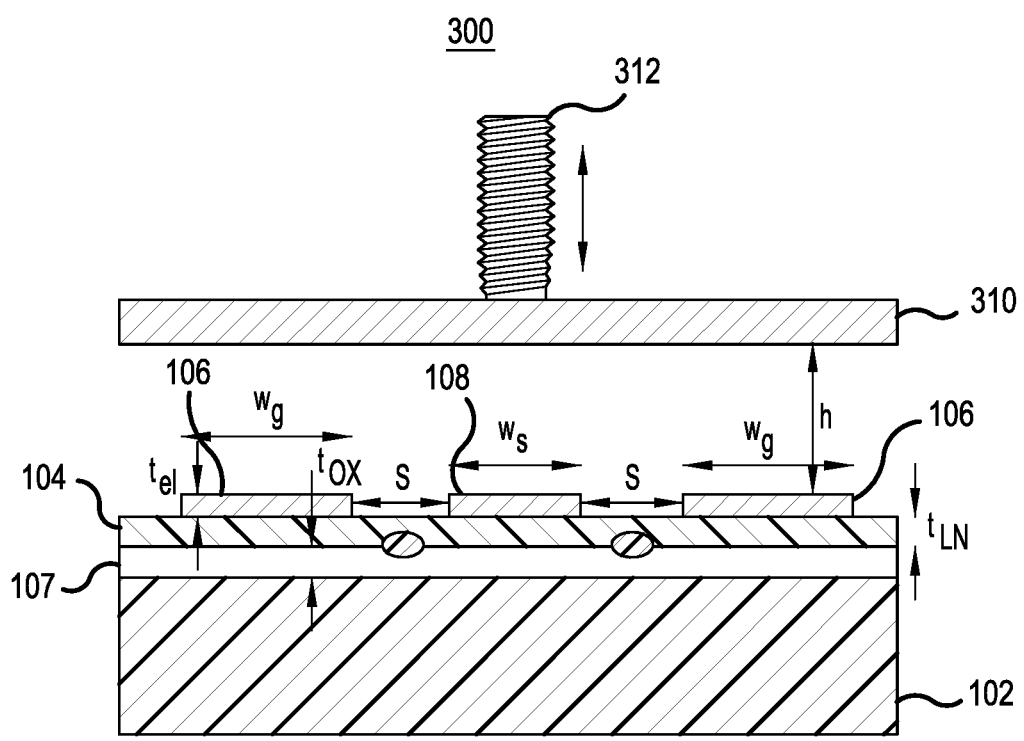
FIG. 3 is a cross-sectional view of an EO modulator according to a representative embodiment.

FIG. 3 is a cross-sectional view of an EO modulator 300, according to a representative embodiment. Various aspects and details of the EO modulator 300 are common to those of EO modulators 100, 200 described above. These common aspects and details may not be repeated to avoid obscuring the presently described representative embodiments.

The EO modulator 300 comprises substrate 102, and EO material layer 104 disposed over the substrate 102. Ground electrodes 106 are disposed on both sides of signal electrode 108, with the ground electrodes 106 having a width $w_g$, and signal electrodes $w_s$. The ground and signal electrodes 106, 108 have a thickness $t_{el}$, as discussed above. As shown, the ground electrodes 106 are spaced from the signal electrode 108 by a distance 'S' and provide a coplanar waveguide (CPW). In a representative embodiment, a thin film adhesion-promoting layer 107 (e.g., an oxide such as $SiO_2$) is disposed between the EO material layer 104, which is illustratively a thin film of lithium niobate ($LiNbO_3$) (TFLN).

Optical waveguide cores ('cores') 105 are disposed in the EO material layer 104 as shown, and are made of silicon with the EO material layer 104 and the substrate 102 providing the cladding layer for the optical waveguides comprising the optical waveguide cores 105. Other known materials such as silicon nitride, titanium(Ti)-doped $LiNbO_3$, or proton-exchanged $LiNbO_3$ are also contemplated for the optical waveguide cores 105. As depicted in FIG. 3, the optical waveguides are disposed in the space S between the ground electrodes 106 and the signal electrode 108, and slightly below the ground electrodes 106 and the signal electrode 108. As will be appreciated by one of ordinary skill in the art, the EO modulator 100 may be used in one of a variety of applications. For example, the optical waveguides may provide arms for a Mach-Zehnder interferometer, such as disclosed in commonly-owned U.S. Patent Application Publication No. 20210131873 entitled "Optical Wavemeter." The entire disclosure of U.S. Patent Application Publication No. 20210131873 is specifically incorporated herein by reference.

The EO modulator 100 further comprises a superstrate 310 suspended above the substrate 102, and separated from the ground electrodes 106 and signal electrode 108 by a height 'h.' An actuator 112 adapted to raise and lower the superstrate 110 and thereby adjust the height 'h' for reasons explained more fully below. Notably, the actuator 112 may be one of a number of devices within the purview of one of ordinary skill in the art. Just by way of example, the actuator 112 may be one of a variety of known microelectromechanical systems (MEMs) devices.

In certain embodiments, as described more fully below, the superstrate 110 is adapted to be disposed in a first position at which the RF phase velocity of the CPW substantially matches the OGV at a first optical wavelength; and after movement of the superstrate 110 by the actuator 112, the superstrate 110 is adapted to be disposed in a second position at which the RF phase velocity of the CPW substantially matches the OGV at a second optical wavelength. Notably, as will become clearer as the present description continues, the adjustment of the height 'h' affords the option of having an EO modulator that can be tuned so the RF phase velocity of the CPW substantially matches the OGV at a number of optical wavelengths. Alternatively, the EO modulator 100 may operate in a binary mode, with the height 'h' having two values to match the RF phase velocity of the CPW substantially matches the OGV at two optical wavelengths (e.g., 1310 nm and 1550 nm).

In accordance with a representative embodiment, the substrate 102 comprises silicon (Si) or other suitably material commonly used in TFLN modulators and thus are within the purview of one of ordinary skill in the art.

The superstrate 310 comprises a layer of metal or metal alloy. Notably, when the superstrate is disposed in the second (lowered) position, there are two perturbations to the CPW. First, capacitance per unit length is raised (as in the case when the superstrate 110, 210 are made of a dielectric material such as high-resistivity silicon); and the inductance per unit length is lowered. It turns out that in practice, the inductance per unit length dominates, resulting in an increase in RF phase velocity.

Because of the adjustment of the height 'h' of the superstrate 310, the EO modulator 300 is adapted to function at a variety of wavelengths, while beneficially providing an RF phase velocity of the CPW that substantially matches the OGV. At comparatively longer operating optical wavelengths, such as 1550 nm, the superstrate 110 is raised comparatively high above the CPW. So, in the presently described representative embodiment, the CPW with the superstrate raised to essentially be at a height 'h' of infinity is designed for velocity match at the shorter wavelengths. As such, using the actuator 312, the superstrate 310 is raised when operating at comparatively short optical wavelengths (e.g., 1310 nm), and the superstrate 310 is lowered when operating at comparatively long wavelengths (e.g., 1550 nm). EM simulation shows that RF loss is basically unaffected when the superstrate 310 is lowered, even when using aluminum rather than gold.

In accordance with certain representative embodiments, the height 'h' is selected to be significantly greater (e.g., at least three times greater) than the spacing 's' between the signal electrode 108 and the ground electrodes 106. The entire CPW structure comprising the EO material layer 104, thin film adhesion-promoting layer 107, and the substrate 102 is electromagnetically (EM) designed using any of a number of available EM simulation tools so that the RF phase velocity at the highest operating frequency of interest, (e.g., 300 GHz), substantially matches the optical group velocity at 1310 nm in this "bridge up" state. Since bottom of the superstrate 310 ("bridge") is well above the top of the signal electrode 108 and the ground electrodes 106 of the CPW, the height 'h' can be considered at infinity. Thus, at this height 'h' the superstrate 310 can be considered absent, and is equivalent to the EO modulator 100 being optimized and free from electromagnetic coupling to the substrate. Stated somewhat differently, by selecting the height 'h' of the superstrate 310 to be high as noted above, the superstrate 110 functions as a dielectric layer of the CPW having a dielectric constant of air (e.g., 1).

By contrast, at comparatively shorter operating optical wavelengths for the EO modulator 100 (e.g., 1310 nm), the superstrate 310 is lowered (and the height 'h' reduced) by the actuator to be in electromagnetic proximity to the ground electrodes 106 and the signal electrode 108. In this lowered state the inductance per unit length dominates, and the RF phase velocity of the CPW is increased compared to the case where the height 'h' is essentially at infinity.

Accordingly, using the actuator 112 to adjust the space between the ground and signal electrodes 106, 108 (i.e., 'h') and the superstrate 310, the user can provide a structure at which the RF phase velocity of the CPW substantially matches the OGV of the optical signals traversing the optical waveguides comprising optical waveguide cores 105. As such, by the present representative embodiments, the height 'h' can be adjusted to tune the structure so the optimal matching of the RF phase velocity of the CPW matches the OGV of the optical signals is achieved. Alternatively, the height 'h' can be selected to be disposed at one of two heights 'h;' with a first height 'h' set for operation at one optical wavelength (e.g., 1310 nm), and a second height 'h' set for operation at one optical wavelength (e.g., 1550 nm). Furthermore, and as discussed more fully below, the actuator 112 can be foregone and the material of the superstrate 110 can be selected to provide a dielectric constant, thickness, and height 'h' for function at one optical wavelength and be removed for operation at another optical wavelength.

Notably, the optical modes that traverse the optical waveguides comprising the optical waveguide cores 105 and one of a variety of cladding layers depending on the selected height 'h' and material used for the superstrate 110, is unaffected by the position of the superstrate 110 since the optical modes are confined below the upper surface of the EO material layer 104. As such, the group velocity is not impacted by changes in 'h' or the materials selected for the superstrate 110.

Figure 4:
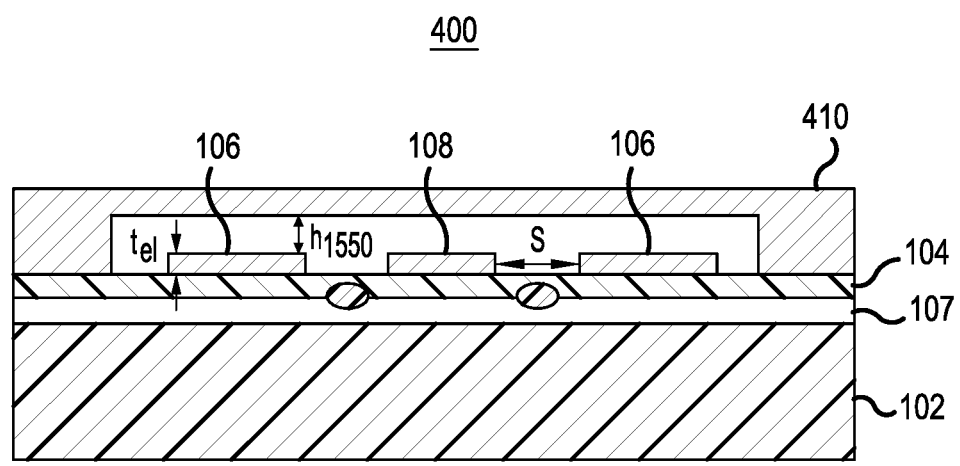
FIG. 4 is a cross-sectional view of an EO modulator according to a representative embodiment.

FIG. 4 is a cross-sectional view of an EO modulator 400, according to a representative embodiment. Various aspects and details of the EO modulator 400 are common to those of EO modulators 100, 200, 300 described above. These common aspects and details may not be repeated to avoid obscuring the presently described representative embodiments.

The EO modulator 400 comprises substrate 102, and EO material layer 104 disposed over the substrate 102. Ground electrodes 106 are disposed on both sides of the signal electrode 108, with the ground electrodes 106 having a width $w_g$, and signal electrodes $w_s$. The ground and signal electrodes 106, 108 have a thickness $t_{el}$, as discussed above. As shown, the ground electrodes 106 are spaced from the signal electrode 108 by a distance 'S' and provide a coplanar waveguide (CPW). In a representative embodiment, thin film adhesion-promoting layer 107 (e.g., an oxide such as $SiO_2$) is disposed between the EO material layer 104, which is illustratively a thin film of lithium niobate ($LiNbO_3$) (TFLN).

Optical waveguide cores ('cores') 105 are disposed in the EO material layer 104 as shown, and are made of silicon with the EO material layer 104 and the substrate 102 providing the cladding layer for the optical waveguides comprising the optical waveguide cores 105. Other known materials such as silicon nitride, titanium(Ti)-doped $LiNbO_3$, or proton-exchanged $LiNbO_3$ are also contemplated for the optical waveguide cores 105. As depicted in FIG. 4, the optical waveguides are disposed in the space S between the ground electrodes 106 and the signal electrode 108, and slightly below the ground electrodes 106 and the signal electrode 108. As will be appreciated by one of ordinary skill in the art, the EO modulator 400 may be used in one of a variety of applications. For example, the optical waveguides may provide arms for a Mach-Zehnder interferometer, such as disclosed in commonly-owned U.S. Patent Application Publication No. 20210131873 entitled "Optical Wavemeter." The entire disclosure of U.S. Patent Application Publication No. 20210131873 is specifically incorporated herein by reference.

The EO modulator 400 further comprises a superstrate 410 disposed thereabove, and separated from the ground electrodes 106 and signal electrode 108 by a height 'h.' In the presently described representative embodiment the superstrate 410 is a metal or a metal alloy, and is designed to be disposed over the substrate 102 for operation of the EO modulator 400 at one optical wavelength, and to be removed from the superstrate 410 for operation of the EO modulator 200 at another optical wavelength. In certain embodiments, the superstrate 410 is disposed over the substrate 102 at the height '$h_{1550}$' at which the RF phase velocity of the CPW substantially matches the OGV at a 1550 nm, for example (more generally at a first optical wavelength); and after removal of the superstrate 410, the RF phase velocity of the CPW substantially matches the OGV at 1310 nm, for example, (more generally at a second optical wavelength that is shorter than the first optical wavelength). As such, the EO modulator 400 operates in a binary mode, with the height 'h' having two values ('$h_{1550}$' and infinity) to match the RF phase velocity of the CPW substantially matches the OGV at two optical wavelengths (e.g., 1310 nm and 1550 nm).

As alluded to above, the EO modulator 400 is adapted to function at a variety of wavelengths, while beneficially providing an RF phase velocity of the CPW that substantially matches the OGV. At comparatively longer operating optical wavelengths, such as 1550 nm, the superstrate 110 is lowered comparatively closer the CPW. In accordance with certain representative embodiments, the superstrate 410 is removed, and as such, much greater than the spacing 's' between the signal electrode 108 and the ground electrodes 106. The entire CPW structure comprising the EO material layer 104, thin film adhesion-promoting layer 107, and the substrate 102 is electromagnetically (EM) designed using any of a number of available EM simulation tools so that the RF phase velocity at the highest operating frequency of interest, (e.g., 300 GHz), substantially matches the optical group velocity at 1550 nm in this "bridge down" state. Since the superstrate 410 is absent, the structure is equivalent to the EO modulator 400 being optimized and free from electromagnetic coupling to the substrate. Stated somewhat differently, by selecting the height 'h' of the superstrate 410 to be high as noted above, the superstrate 410 functions as a dielectric layer of the CPW having a dielectric constant of air (e.g., 1).

By contrast, at comparatively longer operating optical wavelengths for the EO modulator 400 (e.g., 1550 nm), the superstrate 410 is disposed over the substrate 102 at the height $h_{1550}$ and is in electromagnetic proximity to the ground electrodes 106 and the signal electrode 108. When disposed over the substrate 102 as shown in FIG. 4, the superstrate 410 the change in inductance per unit length the superstrate 210 dominates and the and the RF phase velocity of the CPW is increased compared to the case where the height 'h' is essentially at infinity.

As a result, the RF phase velocity is reduced compared to when the superstrate 210 is removed. In this case, the hybrid dielectric layer comprising air and the superstrate 110 provides an optical group index of refraction for the waveguides comprising optical waveguide cores 105 that is lower than when the superstrate 410 is raised to essentially ∞. The comparatively lower group index results in a group velocity that is higher at the longer wavelength (e.g., 1550) of the EO modulator. Accordingly, by disposing or removing the superstrate 210 the user can provide a structure at which the RF phase velocity of the CPW substantially matches the OGV of the optical signals traversing the optical waveguides comprising optical waveguide cores 105 at two operational optical wavelengths. As such, by the present representative embodiments, the height 'h' can be set to height $h_{1550}$ or infinity to provide a optimal matching of the RF phase velocity of the CPW matches the OGV at one optical wavelength (e.g., 1310 nm), or for operation at another optical wavelength (e.g., 1550 nm), respectively.

The superstrate 410 may be fabricated using a known micromachining or etching sequence of aluminum, for example. Alternatively, a flat plate of Al could have posts electroplated at its ends to a desired height to provide the height '$h_{1550}$'. Notably, the posts may be made from a different material than the substrate, which is illustratively aluminum.

Notably, the optical modes that traverse the optical waveguides comprising the optical waveguide cores 105 and one of a variety of cladding layers depending on the selected height 'h' and material used for the superstrate 110, is unaffected by the position of the superstrate 110 since the optical modes are confined below the upper surface of the EO material layer 104. As such, the group velocity is not impacted by changes in 'h' or the materials selected for the superstrate 110.

Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. An electro-optic (EO) modulator, comprising:
a substrate;
an EO material layer disposed over the substrate, wherein the EO material layer and the substrate provide an optical waveguide having an optical group velocity (OGV);
electrodes disposed over the EO material layer to provide a coplanar waveguide (CPW), wherein the CPW has a radio-frequency (RF) phase velocity, the electrodes having a gap therebetween; and
a superstrate disposed over the EO material layer and configured to be raised and lowered to tune the RF phase velocity to be substantially the same as the OGV, wherein: a space exists between the superstrate and the EO material; and the superstrate consists of at least one of: a silicon layer having a resistivity of 100 Ω-cm; a substantially electrically insulating layer; a Gallium Arsenide (GaAs) layer, an Indium Phosphide (InP) layer, a sapphire layer; an alumina layer; a Titanium Dioxide ($TiO_2$) layer; and a Strontium Titanate ($SrTiO_3$) layer.

2. The EO modulator of claim 1, wherein the superstrate is adapted to be disposed in a first position at which the RF phase velocity of the CPW substantially matches the OGV at a first optical wavelength.

3. The EO modulator of claim 2, wherein the superstrate is adapted to be disposed in a second position at which the RF phase velocity of the CPW substantially matches the OGV at a second optical wavelength.

4. The EO modulator of claim 3, wherein the superstrate is adapted to be disposed in a second position at which an inductance per unit length of the CPW is decreased compared to the inductance per unit length of the CPW in the first position.

5. The EO modulator of claim 1, further comprising a microelectromechanical system (MEMS) actuator that selectively raises and lowers the superstrate.

6. The EO modulator of claim 1, wherein the optical waveguide further comprises an adhesion layer disposed between the EO material and the substrate.

7. The EO modulator of claim 1, wherein the optical waveguide is disposed adjacent to and below a gap between the electrodes.

8. The EO modulator of claim 7, further comprising a plurality of optical waveguides disposed adjacent to and below a plurality of gaps between the electrodes and each of the plurality of optical waveguides provides an arm of a Mach-Zehnder Interferometer (MZI).

9. An electro-optic (EO) modulator, comprising:
a substrate;
an EO material layer disposed over the substrate, wherein the EO material layer and the substrate provide an optical waveguide having an optical group velocity (OGV);
electrodes disposed over the EO material layer to provide a coplanar waveguide (CPW), wherein the CPW has a radio-frequency (RF) phase velocity, the electrodes having a gap therebetween; and
a superstrate disposed over the EO material layer, wherein: the superstrate is configured to be removed from the EO modulator to tune the RF phase velocity to be substantially the same as the OGV, wherein a space exists between the superstrate and the EO material; and the superstrate consists of at least one of: a silicon layer having a resistivity of 100 Ω-cm; a substantially electrically insulating layer; a Gallium Arsenide (GaAs) layer, an Indium Phosphide (InP) layer, a sapphire layer; an alumina layer; a Titanium Dioxide ($TiO_2$) layer; and a Strontium Titanate ($SrTiO_3$) layer.

10. The EO modulator of claim 9, wherein when the superstrate is disposed over the EO modulator the space has a magnitude at which the RF phase velocity of the CPW substantially matches the OGV at a first optical wavelength.

11. The EO modulator of claim 10, wherein when the superstrate is removed from the EO modulator the space has a magnitude at which the RF phase velocity of the CPW substantially matches the OGV at a second optical wavelength.

12. The EO modulator of claim 10, wherein when the superstrate is disposed over the EO modulator an inductance per unit length of the CPW is decreased compared to the inductance per unit length of the CPW when the superstrate is removed from the EO modulator.

13. The EO modulator of claim 9, wherein when the superstrate is disposed over the EO modulator an inductance per unit length of the CPW is decreased compared to the inductance per unit length of the CPW when the superstrate is removed.

14. The EO modulator of claim 9, further comprising a plurality of optical waveguides disposed adjacent to and below a plurality of gaps between the electrodes.

15. The EO modulator of claim 14, wherein each of the plurality of optical waveguides provides an arm of a Mach-Zehnder Interferometer (MZI).

* * * * *